United States Patent
Holm et al.

(10) Patent No.: US 9,193,435 B2
(45) Date of Patent: Nov. 24, 2015

(54) CONDENSATION WATER-FREE INSULATION SYSTEM FOR PASSENGER AIRCRAFT

(71) Applicants: AIRBUS OPERATIONS GMBH, Hamburg (DE); Fraunhofer-Gesellschaft zur Foerderung der angewandten Forschung e.V., Munich (DE)

(72) Inventors: Andreas Holm, Gmund (DE); Georg Muehlthaler, Hamburg (DE); Rainer Mueller, Rosengarten (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 289 days.

(21) Appl. No.: 13/865,360

(22) Filed: Apr. 18, 2013

(65) Prior Publication Data
US 2013/0240668 A1 Sep. 19, 2013

Related U.S. Application Data (63) Continuation of application No. PCT/EP2011/068272, filed on Oct. 19, 2011.

(60) Provisional application No. 61/405,020, filed on Oct. 20, 2010.

(30) Foreign Application Priority Data

Oct. 20, 2010 (DE) .......................... 10 2010 048 998

(51) Int. Cl.
*B64C 1/40* (2006.01)
*B64C 1/06* (2006.01)

(52) U.S. Cl.
CPC .. *B64C 1/40* (2013.01); *B64C 1/067* (2013.01)

(58) Field of Classification Search
None
See application file for complete search history.

(56) References Cited

U.S. PATENT DOCUMENTS 2,324,654 A * 7/1943 Tinnerman et al. ............. 52/479
2,912,724 A * 11/1959 Wilkes ......................... 52/302.3
(Continued)

FOREIGN PATENT DOCUMENTS

CN 1980817 A 6/2007
CN 101772451 A 7/2010
(Continued)

OTHER PUBLICATIONS

International Searching Authority, International Search Report dated Apr. 5, 2012 for International Patent Application No. PCT/EP2011/068272.
(Continued)

*Primary Examiner* — Medhat Badawi
(74) *Attorney, Agent, or Firm* — Ingrassia, Fisher & Lorenz, P.C.

(57) ABSTRACT

An insulation arrangement for thermally and acoustically insulating an aircraft fuselage, which comprises at least one insulation packet arranged on an exterior skin of the aircraft. The insulation packet includes dimensionally rigid foam, and comprises a shape corresponding at least with a structural component on the exterior skin, as the result of which the insulation packet is retained on the structural component even without any additional attachment elements. As a result, ventilation openings need not be provided, thereby reducing condensation water accumulating in aircraft insulation.

17 Claims, 7 Drawing Sheets

(56) References Cited

U.S. PATENT DOCUMENTS

| | | | | |
|---|---|---|---|---|
| 3,077,426 | A * | 2/1963 | Johnston | 181/286 |
| 3,090,646 | A * | 5/1963 | Johnson | 296/107.11 |
| 3,231,944 | A * | 2/1966 | Bennett | 52/406.1 |
| 3,775,921 | A * | 12/1973 | Avera | 52/471 |
| 3,867,244 | A * | 2/1975 | Adams | 428/182 |
| 4,235,398 | A * | 11/1980 | Johnson | 244/119 |
| 4,291,851 | A * | 9/1981 | Johnson | 244/119 |
| 4,308,309 | A * | 12/1981 | Frosch et al. | 428/193 |
| 4,318,260 | A * | 3/1982 | Siegel et al. | 52/407.4 |
| 4,344,591 | A * | 8/1982 | Jackson | 244/159.1 |
| 4,488,619 | A * | 12/1984 | O'Neill | 181/290 |
| 4,927,705 | A * | 5/1990 | Syme et al. | 428/192 |
| 4,940,112 | A * | 7/1990 | O'Neill | 181/290 |
| 5,030,518 | A * | 7/1991 | Keller | 428/550 |
| 5,048,248 | A * | 9/1991 | Ting | 52/309.9 |
| 5,398,889 | A * | 3/1995 | White et al. | 244/119 |
| 5,472,760 | A * | 12/1995 | Norvell | 428/71 |
| 5,511,747 | A * | 4/1996 | Parrot et al. | 244/159.1 |
| 5,545,273 | A * | 8/1996 | Rasky et al. | 156/60 |
| 5,565,254 | A * | 10/1996 | Norvell | 428/71 |
| 5,577,688 | A * | 11/1996 | Sloan | 244/117 R |
| 5,611,504 | A * | 3/1997 | Haynes et al. | 244/119 |
| 5,759,659 | A * | 6/1998 | Sanocki et al. | 428/74 |
| 5,779,193 | A | 7/1998 | Sloan | |
| 5,788,184 | A * | 8/1998 | Eddy | 244/121 |
| 5,806,272 | A * | 9/1998 | Lafond | 52/786.13 |
| 5,811,167 | A * | 9/1998 | Norvell | 428/76 |
| 7,040,575 | B2 * | 5/2006 | Struve et al. | 244/118.5 |
| 7,108,227 | B2 * | 9/2006 | Kunzel et al. | 244/119 |
| 7,946,525 | B2 * | 5/2011 | Groning | 244/1 N |
| 8,016,241 | B2 * | 9/2011 | Moores et al. | 244/171.7 |
| 8,157,209 | B2 * | 4/2012 | Dittmar et al. | 244/117 R |
| 8,245,974 | B2 * | 8/2012 | Paul | 244/129.1 |
| 8,490,365 | B2 * | 7/2013 | Mueller et al. | 52/783.1 |
| 8,616,498 | B2 * | 12/2013 | Hossain et al. | 244/121 |
| 8,662,448 | B2 * | 3/2014 | Weston et al. | 244/119 |
| 8,882,041 | B2 * | 11/2014 | Mueller et al. | 244/121 |
| 2002/0168184 | A1 * | 11/2002 | Meisiek | 392/435 |
| 2004/0175516 | A1 * | 9/2004 | Schmitz et al. | 428/34.1 |
| 2006/0118676 | A1 * | 6/2006 | Novak et al. | 244/129.1 |
| 2006/0145006 | A1 * | 7/2006 | Drost | 244/118.5 |
| 2006/0194893 | A1 * | 8/2006 | Prybutok | 521/136 |
| 2010/0199583 | A1 * | 8/2010 | Behrens et al. | 52/396.01 |
| 2011/0027526 | A1 * | 2/2011 | McCarville et al. | 428/116 |
| 2011/0284689 | A1 * | 11/2011 | Thomas et al. | 244/1 N |
| 2013/0240668 | A1 * | 9/2013 | Holm et al. | 244/1 N |
| 2013/0299630 | A1 * | 11/2013 | Redecker et al. | 244/1 N |

FOREIGN PATENT DOCUMENTS

| | | | |
|---|---|---|---|
| WO | 0024632 | A1 | 5/2000 |
| WO | 2006007502 | A1 | 1/2006 |
| WO | 2006098745 | A2 | 9/2006 |

OTHER PUBLICATIONS

German Patent and Trade Mark Office, German Office Action for German Patent Application No. 102010048998.0, mailed Feb. 26, 2014.

European Patent Office, European Office Action for European Patent Application No. 11771152.3, mailed Mar. 18, 2014.

European Patent Office, Office Action for European Patent Application No. 11 771 152.3-1757, mailed Dec. 22, 2014.

State Intellectual Property Office of the Peoples' Republic of China, Office Action for Chinese Patent Application No. 201180050732.6, mailed Sep. 12, 2014.

State Intellectual Property Office of the Peoples' Republic of China, Office Action for Chinese Patent Application No. 201180050732.6 mailed May 19, 2015.

* cited by examiner

CONDENSATION WATER-FREE INSULATION SYSTEM FOR PASSENGER AIRCRAFT

CROSS-REFERENCE TO RELATED APPLICATIONS

This is a continuation of International Patent Application PCT/EP2011/068272, filed Oct. 19, 2011, which claims priority to German Patent Application No. 10 2010 048 998.0, filed Oct. 20, 2010, and to U.S. Provisional Patent Application No. 61/405,020, filed Oct. 20, 2010, which are incorporated herein by reference in their entirety.

TECHNICAL FIELD

The technical field relates to an insulation arrangement for thermally and acoustically insulating an aircraft fuselage, an aircraft with an aircraft fuselage, and an insulation arrangement installed therein, as well as to an insulation packet.

BACKGROUND

Conventional insulation packets for thermally and acoustically insulating an aircraft fuselage consist for the most part of voluminous nonwoven materials, which are used in matte form, comprise attachment openings through which retainers are passed, and can be easily compressed during attachment to the fuselage structure by means of attachment clips to be secured to the retainers. To prevent moisture from penetrating into the insulation material, use is made of sheathing films that incorporate ventilation holes to enable pressure compensation and prevent damage to the film when installing the insulation packet. At the same time, the ventilation holes prevent the insulation packets from expanding in flight given a drop or rise in cabin pressure.

During a prolonged flight, condensation water accumulates inside of such insulation packets, which primarily has two essential causes. On the one hand, the insulation packets can directly abut the inside of the structure of the aircraft fuselage, which is coated with a thin film of condensation water after practically every flight. On the other hand, moist air makes its way into the insulation packets as the result of convective effects and diffusion by way of the ventilation holes and also diffusion through the closed sheathing film, where they lead to water condensation when the incoming air drops below the dew point during flight owing to the low temperatures of the aircraft fuselage. To remove the condensation water, drainage holes are often incorporated on the bottom of the insulation packets, but are only effective under certain conditions, since part of the condensation water gets retained in the form of drops on the pores or fibers of the insulation material. Furthermore, additional moist air gets into the insulation packets through the drainage holes, which can accelerate water condensation in the insulation even more. In the end, this leads to extra weight in the aircraft and accelerated ageing of the insulation.

EP 1 124 720 B1 and US 20040175516 A1 show an insulation arrangement for insulating the interior of an aircraft with insulation packets, which are completely enveloped by film that allows the diffusion of gases.

In addition, other objects, desirable features and characteristics will become apparent from the subsequent summary and detailed description, and the appended claims, taken in conjunction with the accompanying drawings and this background.

SUMMARY

Consequently, the present disclosure provides an insulation arrangement for an aircraft in which an accumulation of condensation water can be diminished or avoided entirely, while maintaining at least the same quality of insulation and at most the same weight in relation to known insulation arrangements for aircraft.

One aspect of the present disclosure shows the insulation arrangement for thermally and acoustically insulating an aircraft fuselage, comprising at least one insulation packet that is applicable on an exterior skin of the aircraft fuselage. What makes the insulation arrangement according to the present disclosure special is that the insulation packet includes dimensionally stiff foam and comprises a shape corresponding at least with a structural component on the exterior skin, as the result of which the insulation packet is retained on the structural component even without any additional attachment elements.

As a consequence, the insulation arrangement comprises one or more insulation packets, which do not consist of a voluminous, soft and compressible material that enables compression during clip assembly. Rather, the term "dimensionally stiff" means that the used foam is dimensionally stable enough to make it as incompressible as possible, requiring that the shape be tailored to the structures to be insulated. According to the present disclosure, the insulation packet is shaped to correspond with at least one structural component in such a way as to be automatically retained on this structural component without additional attachment elements. This could be realized by various measures, which can yield a positive or non-positive connection.

The statement that the insulation packet is applicable on the exterior skin is not to be construed as a limitation in the form of a direct positioning of insulation packets on the exterior skin. Rather, insulation arrangements usually extend in a gap that is enveloped by the interior cladding of a passenger cabin and an exterior skin of the aircraft, without requiring any direct contact with the exterior skin in the process. Therefore, insulation packets can be positioned directly in the exterior skin, or also form a gap.

The special advantage to using dimensionally stiff foam is that the nearly achieved incompressibility makes it possible to omit the ventilation holes required for purposes of pressure compensation. As a result, ventilation can also not allow moist air to get into the insulation packet, thereby eliminating a possible source of condensation water. In addition, the absence of ventilation holes also tangibly reduces the danger of bursting during assembly by comparison to glass wool or other voluminous materials. Pressure must be compensated throughout a flight even in the case of foam, but the foam itself already realizes this without any further precautionary measures, so that even pressure changes during individual flight missions are not expected to destroy the foam.

Let it be noted at this juncture that dimensionally stiff foams of this kind can be realized both as closed-cell and open-cell foams, for example comprised of melamine or polyamide. Open-cell foams are susceptible to the entry of moist air and its condensation within the foam material. This can be prevented by correspondingly encapsulating the insulation packet, wherein the capsule can be designed as a sheathing film or lamination, while the use of closed-cell foams would at the same time eliminate the need for this capsule. In the latter case, however, the weight of the insulation packet would distinctly rise by comparison to an insulation packet made of open-cell foam, which is why open-cell foams with a sheathing film or lamination may be preferred.

In one exemplary embodiment, the unstressed insulation packet, in order to establish a clamping attachment between two spaced apart structural components arranged on the exterior skin, comprises a first extension length that exceeds the distance between these two structural components. This enables a clamping attachment for the insulation packet, since the dimensionally rigid foam material could allow itself to be compressed when exposed to a compressive force by slightly exceeding a length defined by the distance between two structural components, wherein the foam material attempts to return to its original shape from this compressed state owing to its dimensional rigidity. If the foam material is incorporated between two structural components, a repelling force hence always acts on the ends of the insulation packet that touch the structural components, leading to a non-positive connection by clamping in the insulation packet. In addition to the corresponding length, the insulation packet should also comprise other geometric properties that are able to accommodate specific shapes of the structural components, for example bulges, bends, undercuts, shoulders and the like.

Alternatively or additionally, an insulation packet of the insulation arrangement according to the present disclosure comprises at least one recess or shoulder, through which the insulation packet can establish a positive connection with a structural component or other insulation packet. A recess can here also be a depression. For example, a flat, even insulation packet could be positively mounted between two fuselage frames in such a way that the head profile of two fuselage frames engage into the recesses of an insulation packet arranged in between them, and are thereby held in place. An insulation packet could further comprise a recess on the side facing the fuselage skin for accommodating a longitudinal stiffening component, thereby additionally securing an end position of the insulation packet.

In addition, if required or desired for improving the insulation, shaping the recesses makes it possible to easily establish a defined distance from the exterior skin to create a gap. Given a pressure reduction inside the cabin, an insulation packet sheathed in film would expand and at least partially seal the gap, which could be used to at least partially block a flow path between field insulation and the fuselage skin and/or an interior cladding, thereby reducing the introduction of harmful, moist air from the cabin into the area of the insulation packet, and again releasing the gap on the floor for drying purposes.

In one example, such an insulation packet can comprise an even, flat shape. This makes the insulation packet especially well suited for manufacturing a so-called "field insulation", for example which covers a skin field region lying between two fuselage frames with a plurality of such insulation packets. The radial extension of an even, flat insulation packet should be distinctly less during integration than the radial extension of the profile of the fuselage frames between which the insulation packet is located.

In another embodiment of the present disclosure, the insulation packet comprises a recess that outwardly extends in a profile cross section of the insulation packet in order to envelop a structural component in a flush manner. Given the dimensional rigidity of the foam, the recess should correspond with the shape of the structural component. In one example, such an insulation packet can be used for a fuselage frame whose cross section could comprise an L, T, double-T or C shape. Therefore, the recess in the insulation packet corresponding thereto makes it possible to secure, plug or hook the insulation packet directly onto the fuselage frame, for example, so that it envelops this profile in a flush manner.

In an embodiment of the present disclosure, the insulation packet comprises a flat, flexible drainage element, which comprises a capillary active material, and extends outwardly from an interior of the insulation packet to an end of the insulation packet. The drainage element is capable of removing condensation water from the insulation packet that accumulated inside the insulation packet during the flight. A portion of the capillary active material, which could encompass aramide or glass fabric, projects out, reliably extracting liquid condensation water from inside of the insulation packet based on the principle of a wick.

In an embodiment, the drainage element is arranged at a lower end of the insulation packet, and extends out of the insulation packet, pointing in the direction away from the exterior skin. This is particularly sensible, since the side of the insulation packet facing the aircraft cabin is the drier side, because it is exposed to the heat from the air in the aircraft cabin, which is rather warm by comparison to the exterior skin, and can thereby dry off the element.

In an embodiment, the insulation packet comprises a drainage opening at its lower end, which ensures that condensation water arising as the result of leaks in the insulation packet, its sheathing film, lamination or the like can be easily removed. When using just a single drainage opening, there is a very slight danger that moist air will get into the insulation path in this way and condense there.

In one embodiment of the present disclosure, two sequential insulation packets overlap each other like scales. This must be understood as meaning that two insulation packets arranged one over the other form an overlapping region, wherein the lower end of the upper insulation packet lies on the upper end of the lower insulation packet. As a result, a drainage element could very easily be guided out of a lower end of an upper insulation packet in the overlapping region, come to lie on a side of an underlying insulation packet facing the passenger cabin, so as to be dried there. Similarly, a liquid-tight drainage film or the like can be guided on the side of an upper insulation packet in an overlapping region that faces the aircraft skin along the exterior skin in front of the underlying insulation packet. In this way, the condensation water can run downwardly along the exterior skin under the force of gravity, without there being any danger that condensation water will get between two insulation packets in the direction of the passenger cabin.

In an embodiment, the insulation arrangement further comprises a liquid-tight drainage film, which, on a side of an upper insulation packet in an overlapping region that faces the exterior skin, is guided along the exterior skin in front of the underlying insulation packet. In this way, arising condensation water can flow along the exterior skin on the insulation packets without getting into adjacent insulation packets or into an aircraft cabin.

In one embodiment of the present disclosure, a gap is formed between the insulation packet and exterior skin of the aircraft fuselage for discharging condensation water and providing added insulation by way of an air cushion. Because of the larger distance between the insulation packet and exterior skin, this gap also diminishes the danger of condensation water entering into the respective insulation packet, so that the dimensionally rigid foam combined with the gap to the exterior skin already brings about a clear reduction in the danger that condensation water will accumulate.

In an embodiment, the insulation packet comprises a sheathing film, which incorporates at least one vent valve, so as to ensure pressure compensation inside the insulation packet given pressure changes in the cabin, but also while compressing the foam in the insulation packet during the installation process.

In one embodiment, the insulation arrangement according to the present disclosure also comprises an insulation packet comprised of a flexible, voluminous material having a sheathing film that accommodates at least one vent valve. As opposed to a ventilation hole, the vent valve is set up to open a flow cross section for ventilation purposes only starting at a prescribed differential pressure. The latter is completely closed when the differential pressure drops below a level determined by the design of the vent valve. During assembly of the respective insulation packet, the vent valve permits the compression of the insulation packet, but simultaneously also allows ventilation during takeoff and landing phases once a specific differential pressure is present on the vent valve. However, a permanently present opening is prevented. As a result, damage to the sheathing film can be precluded, and continuous exposure of the insulation packet to moist air can be clearly reduced.

The present disclosure also provides an aircraft with an aircraft fuselage and a passenger cabin located therein, which is equipped with an insulation arrangement described above.

Further, an insulation packet with the features described above is also provided. Dimensionally rigid, foam-based insulation packets can also be used to upgrade already existing aircraft ("retrofit"), so that the latter can benefit from the special advantages of lacking condensation water accumulation.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
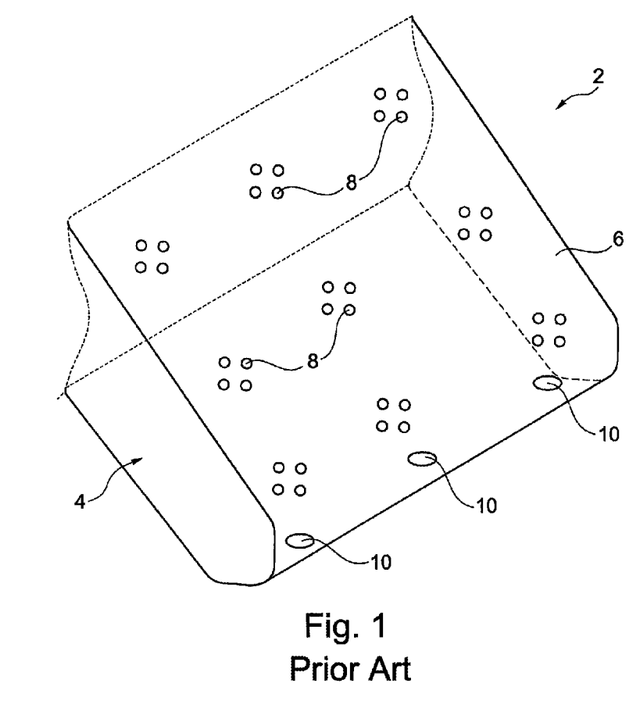
FIG. 1 shows a conventional aircraft insulation from prior art.

FIG. 1 shows a single, mat-like insulation packet 2 according to prior art. The insulation packet 2 essentially consists of a voluminous core material 4 for insulation, which is enveloped by a sheathing film 6 having a series of ventilation holes 8. The latter are provided both to be able to compensate for pressure and compress the insulation packet 2 during assembly, so that the sheathing film 6 can be prevented from bursting. However, moist air gets through the ventilation holes 8 and into the core material 4, where it is always accumulated, but adheres for the most part to fibers due to the voluminous material, and only drips partially out of the insulation packet 2 again by way of drainage holes 10.

Figure 2:
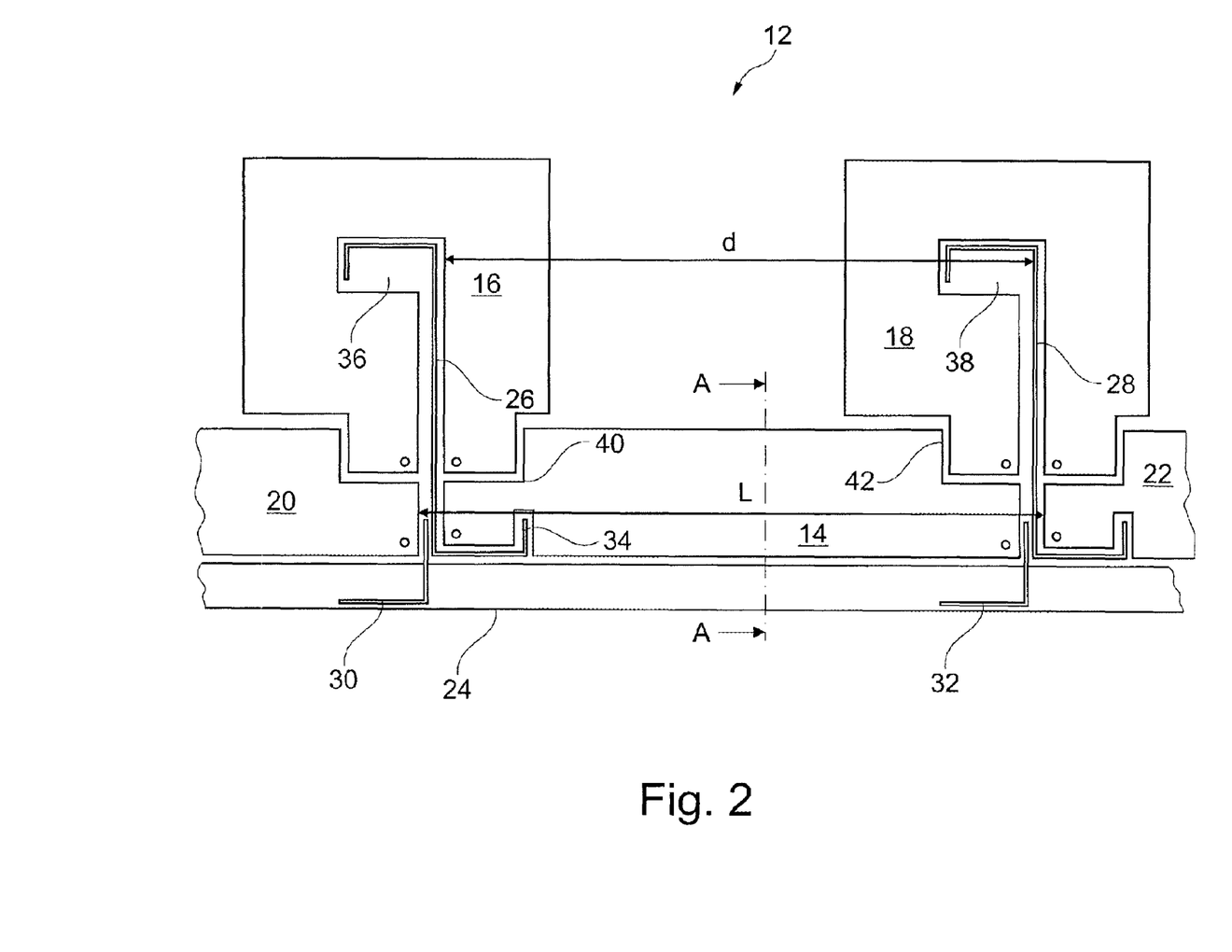
FIG. 2 shows a sectional view of an insulation arrangement according to the present disclosure.

FIG. 2 shows an insulation arrangement 12 according to the present disclosure, which reveals insulation packets 14, 16, 18, 20 and 22 including dimensionally stiff foam, which are spaced apart from an exterior skin 24 and automatically retained on fuselage frames 26 and 28. The fuselage frames 26 and 28 are joined with the exterior skin 24 of the aircraft via connection elements 30 and 32, and comprise a distance d from each other. Situated between the fuselage frames 26 and 28 is the insulation packet 14, which comprises an essentially flat, mat-like shape, and when not exposed to a stress has a length 1 somewhat larger than the distance d of the two fuselage frames 26 and 28. Lightly compressing the insulation packet 14 forces it back into its original shape, thereby exposing the fuselage frames 26 and 28 to a repelling compressive force, causing it to become clamped between the fuselage frames 26 and 28. Due to the flat shape and the provided installation position, the insulation packet 14 in conjunction with the insulation packets 20 and 22 forms the field insulation.

In order to accommodate a beveled area of the fuselage frame 26, the insulation packet 14 comprises a recess 34 that simultaneously yields a positive, hooking connection between the insulation packet 14 and the frame 26. This facilitates assembly of the insulation packet 14, since one end of it can be hooked into the beveled area of the fuselage frame 26, after which its opposite end is constantly compressed, sliding along the fuselage frame 28 toward the exterior skin 24, finally coming to rest in the end position as depicted on FIG. 2.

The insulation packets 16 and 18 each comprise a recess 36 and 38, which corresponds with the shape of the respective fuselage frame 26 and 28. As a consequence, they can be stacked on the fuselage frame 26 and 28, and upon reaching the end position shown on FIG. 2 enter into a positive connection with the respective fuselage frame 26 or 28, thereby ensuring a secure hold. The insulation packets 16 and 18 comprise the frame insulation by way of their shape and installation position.

In addition to the above, the insulation packet 14 comprises two shoulders 40 and 42, which are arranged in an insulation packet 14 in such a way that the insulation packets 16 and 18 come to rest in their installed position. This increases the attachment quality of the insulation packet 14 due to the radially acting safeguarding device, along with the attachment quality of the insulation packets 16 and 18 by pressing the insulation packets 16 and 18 against the fuselage frames 26 and 28.

Figure 3:
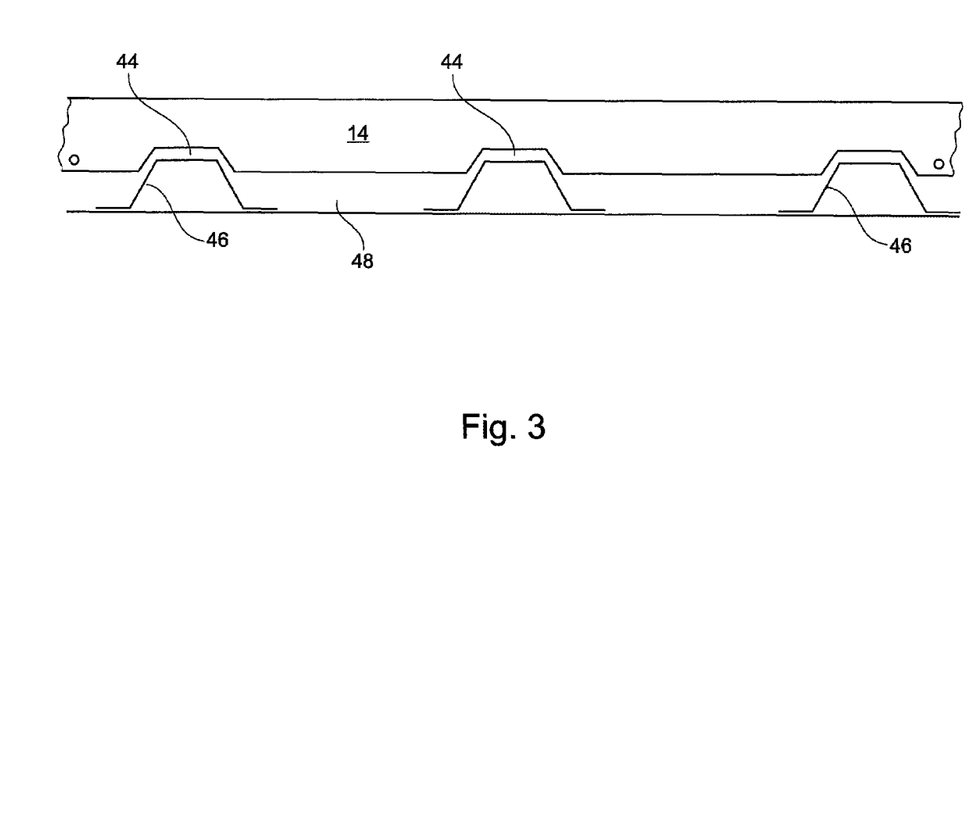
FIG. 3 shows an insulation arrangement according to the present disclosure, limited to a field insulation packet.

The depiction on FIG. 3 presents a view rotated by an angle of 90° of a plane formed by the exterior skin 24. It shows an insulation packet 114 that comprises recesses 44, in which longitudinal stiffening components 46 (so-called "stringers") can be positioned. This additionally secures the end position of the insulation packet 14. In addition, the recesses 44 can be easily shaped to establish a defined distance from the exterior skin 24 to create a gap 48.

Figure 4:
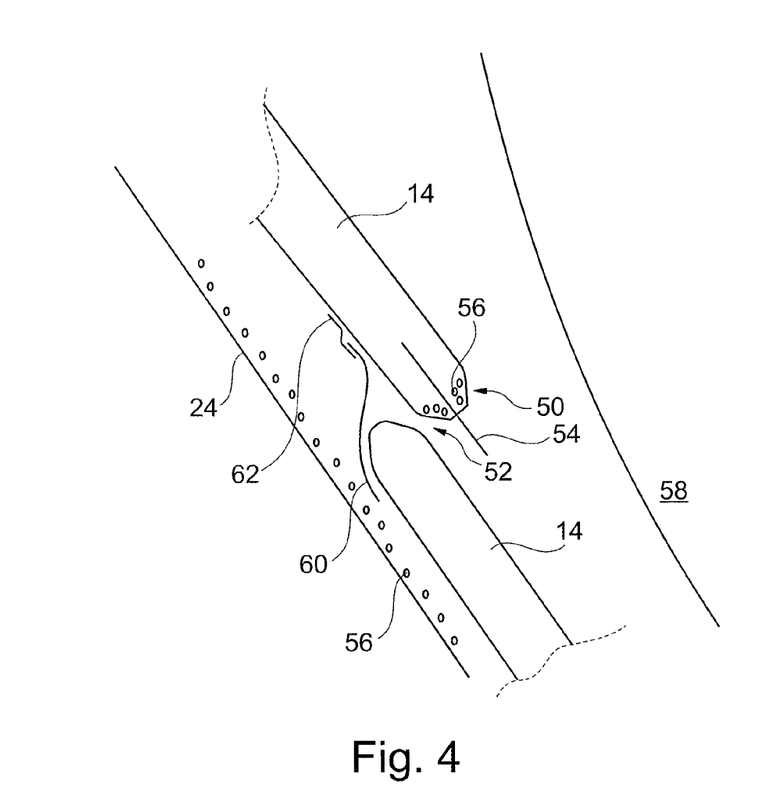
FIG. 4 shows a side view of an insulation arrangement according to the present disclosure.

FIG. 4 shows two insulation packets 14 arranged one atop the other, in which the lower end 50 of an upper insulation packet 14 sits on the upper end 52 of a lower insulation packet. At the lower end 50 of the upper insulation packet 14, a drainage element 54 outwardly projects like a wick from the core of the insulation packet 14, which carries condensation water drops 56 to the outside. The drainage element 54 lies on a side of the insulation arrangement according to the present disclosure facing an aircraft cabin 58, while a drainage film 60 is arranged by means of adhesive tape 62 on the side of the insulation arrangement facing the exterior skin 24, projecting from the upper insulation packet 14 under the lower insulation packet 14, so that condensation water drops 56 can flow by the insulation packets 14 without getting into the insulation packets 14 or to the aircraft cabin 58.

The drainage element 54 is fabricated out of a capillary active material, for example aramide or a glass fabric, and routes out of the insulation packets any condensation water that managed to get into the insulation packets 14 despite the sheathing or encapsulation and absence of ventilation holes, and can dry due to exposure to heat from the aircraft cabin 56.

Figure 5:
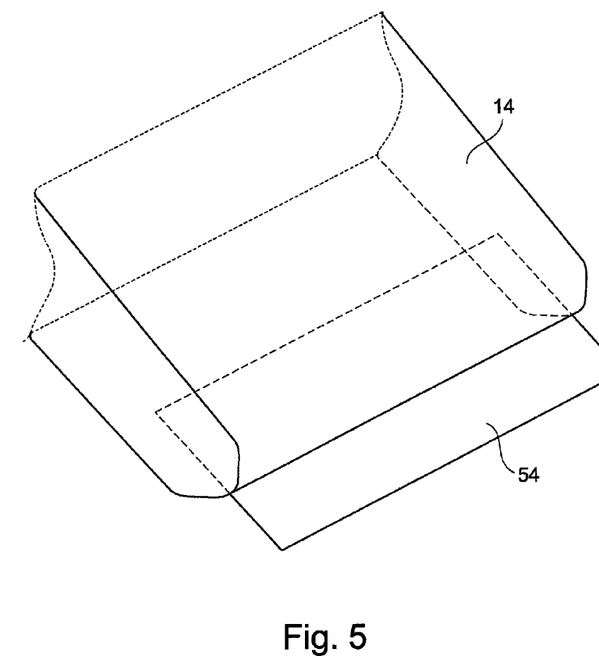
FIG. 5 shows an insulation packet with a drainage fleece.

For purposes of further illustration, FIG. 5 presents a three-dimensional, isometric view of an insulation packet 14 with such a drainage felt 54. The extension of the drainage element 54 into the insulation packet 14 determines the quality of condensation water capturing.

Figure 6:
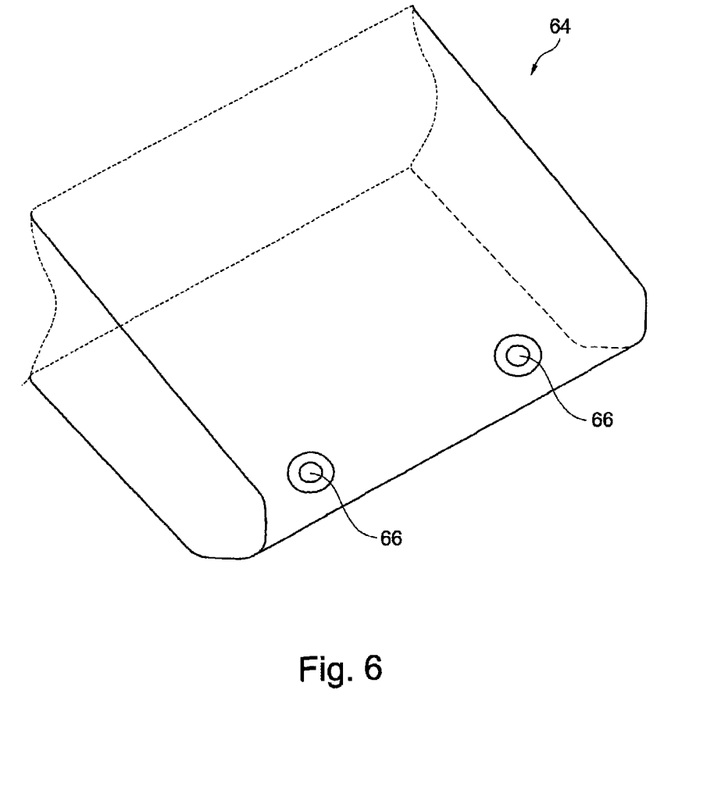
FIG. 6 shows an insulation packet with a ventilation valve.

FIG. 6 shows another insulation packet 64, which comprises a voluminous, compressible core material similar to the prior art on FIG. 1. Despite the advantages to the insulation arrangement according to the present disclosure, it may be necessary to use such a compressible insulation packet 64 at some hard to reach locations on the aircraft fuselage or locations where the stiffening components comprise a complex geometry. In order to minimize the consequences of having to ventilate in terms of the forming condensation water in the insulation packet 64, conventional ventilation holes are replaced by vent valves 66 that only provide an opening cross section once a certain differential pressure has been reached, so that ventilation can take place. These vent valves 66 can comprise a membrane-like, dimensionally stable disk with one or multiple slits, which only yields starting at a certain load, thereby opening the slit that is closed when not exposed to a load. As a result, the insulation packet 64 can be ventilated during assembly, while a continuous exposure to moist air is prevented during cruising flight.

Figure 7:
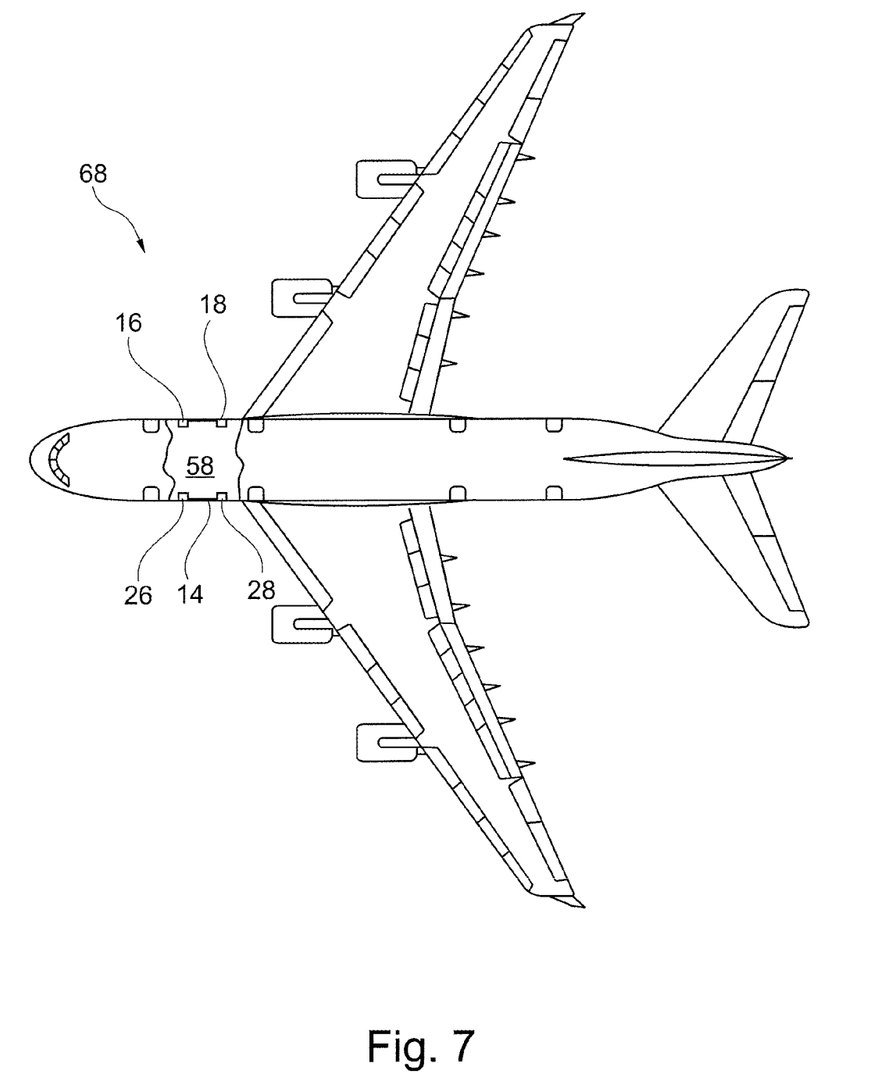
FIG. 7 shows an aircraft having at least one passenger cabin insulated with the insulation arrangement according to the present disclosure.

Finally, FIG. 7 shows an aircraft 68 comprising a passenger cabin 58, in which the insulation arrangement according to the present disclosure could be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An insulation arrangement for thermally and acoustically insulating an aircraft fuselage, comprising:
   at least two insulation packets that are applicable on an exterior skin of the aircraft fuselage, that consist of a dimensionally stiff foam, and comprise a shape corresponding at least with a structural component on the exterior skin, as the result of which the at least two insulation packets are retained on the structural component without any additional attachment elements;
   wherein a first insulation packet comprises at least one recess, through which the first insulation packet establishes a positive connection with the structural component; and
   wherein a second insulation packet comprises at least one shoulder, through which the second insulation packet establishes a positive connection with the first insulation packet.

2. The insulation arrangement of claim 1, wherein the second insulation packet comprises a first extension length that exceeds the distance between two spaced apart structural components for establishing a clamping attachment between two spaced apart structural components arranged on the exterior skin of the at least one insulation packet.

3. The insulation arrangement of claim 1, wherein the second insulation packet comprises a flat shape.

4. The insulation arrangement of claim 1, wherein the first insulation packet comprises a recess that outwardly extends in a profile cross section of the first insulation packet for enveloping the structural component in a flush manner.

5. The insulation arrangement of claim 1, wherein each of the at least two insulation packets comprises a flat, flexible drainage element, which consists of a capillary active material, and extends outwardly from an interior of the at least two insulation packets to an end of the at least two insulation packets, respectively.

6. The insulation arrangement of claim 5, wherein the drainage elements are arranged at a lower end of the at least two insulation packets, and extend out of the insulation packets, pointing in the direction away from the exterior skin.

7. The insulation arrangement of claim 1, wherein the at least two insulation packets comprises a drainage opening at their lower end.

8. The insulation arrangement of claim 1, wherein two sequential insulation packets overlap each other.

9. The insulation arrangement of claim 8, further comprising a liquid-tight drainage film, which on a side of an upper insulation packet in an overlapping region that faces the exterior skin is guided along the exterior skin in front of the underlying insulation packet.

10. The insulation arrangement of claim 1, wherein a gap is formed between the at least two insulation packets and the exterior skin of the aircraft fuselage.

11. The insulation arrangement of claim 1, comprising a sheathing film that incorporates at least one vent valve.

12. The insulation arrangement of claim 1, further comprising a further insulation packet having a flexible, voluminous material having a sheathing film that accommodates at least one vent valve.

13. An aircraft with an aircraft fuselage, comprising:
   an exterior skin and a passenger cabin located therein, which is equipped with an insulation arrangement having at least two insulation packets that consist of a dimensionally stiff foam, and comprise a shape corresponding at least with a structural component on the exterior skin such that the at least two insulation packets are retained on the structural component without attachment elements and each of the at least two insulation packets include a drainage element;

wherein a first insulation packet comprises at least one recess, through which the first insulation packet establishes a positive connection with the structural component; and wherein a second insulation packet comprises at least one shoulder, through which the second insulation packet establishes a positive connection with the first insulation packet.

14. The aircraft of claim 13, wherein the drainage elements are arranged at a lower end of the at least two insulation packets, and extend out of the insulation packets, pointing in the direction away from the exterior skin.

15. The aircraft of claim 13, further comprising:

two sequential insulation packets that overlap.

16. The aircraft of claim 13, comprising a sheathing film that incorporates at least one vent valve.

17. The aircraft of claim 13, wherein the second insulation packet comprises a flat shape.

* * * * *